(12) United States Patent
Wada

(10) Patent No.: US 7,885,331 B2
(45) Date of Patent: Feb. 8, 2011

(54) MOVING PICTURE PROCESSOR, METHOD FOR PROCESSING A MOVING PICTURE, AND COMPUTER PROGRAM PRODUCT FOR EXECUTING AN APPLICATION FOR A MOVING PICTURE PROCESSOR

(75) Inventor: Takahisa Wada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1323 days.

(21) Appl. No.: 11/365,525

(22) Filed: Mar. 2, 2006

(65) Prior Publication Data

US 2006/0198444 A1    Sep. 7, 2006

(30) Foreign Application Priority Data

Mar. 2, 2005    (JP)    ............... 2005-057848

(51) Int. Cl.
    *H04N 11/02*    (2006.01)
(52) U.S. Cl. ............................... 375/240.16
(58) Field of Classification Search ............ 375/240.16, 375/240.24, 240.12
    See application file for complete search history.

(56) References Cited

U.S. PATENT DOCUMENTS 6,567,469 B1 *  5/2003  Rackett ............. 375/240.16

2004/0247031 A1 * 12/2004  Hagai et al. ......... 375/240.16

FOREIGN PATENT DOCUMENTS

| JP | 5-236455 | 9/1993 |
|---|---|---|
| JP | 7-99645 | 4/1995 |
| JP | 2000-50282 | 2/2000 |
| JP | 2004-180044 | 6/2004 |

* cited by examiner

*Primary Examiner*—Khai Tran
(74) *Attorney, Agent, or Firm*—Oblon, Spivak, McClelland, Maier & Neustadt, L.L.P.

(57) ABSTRACT

A moving picture processor includes a first detector configured to detect a reference block most similar to a target block for which motion is to be detected and which is set in a current picture, and to generate a first motion vector candidate indicating a relative position between the target block and the reference block. A second detector is configured to detect a first reference area most similar to a first target area obtained by combining the target block and a first adjacent block adjacent to the target block, and to generate a second motion vector candidate indicating a relative position between the first target area and the first reference area. A determination circuit is configured to determine a motion vector for the target block, based on the first and second motion vector candidates.

20 Claims, 8 Drawing Sheets

| INCLUDED BLOCK | MOTION VECTOR CANDIDATE |
|---|---|
| B1 | Vc1 |
| B1, 2 | Vc2 |
| B1, 2, 3 | Vc3 |
| B1, 4, 5 | Vc4 |
| B1, 6, 9 | Vc5 |
| B1, 7, 8 | Vc6 |
| B1, 2, 3, 4, 5, 6, 7, 8, 9 | Vc7 |

MOVING PICTURE PROCESSOR, METHOD FOR PROCESSING A MOVING PICTURE, AND COMPUTER PROGRAM PRODUCT FOR EXECUTING AN APPLICATION FOR A MOVING PICTURE PROCESSOR

CROSS REFERENCE TO RELATED APPLICATION AND INCORPORATION BY REFERENCE

This application is based upon and claims the benefit of priority from prior Japanese Patent Application P2005-057848 filed on Mar. 2, 2005; the entire contents of which are incorporated by reference herein.

BACKGROUND OF THE INVENTION

1. Field of the Invention

The present invention relates to a moving picture processor, a method for processing a moving picture, a computer program product for executing an application for a moving picture processor, for detecting moving vectors from a moving picture.

2. Description of the Related Art

In recent years, the international standardization of picture coding has been rapidly pursued. Picture coding schemes include joint photographic experts group (JPEG) which stands is a still picture coding standard; H.263 and H.264, which are moving picture coding standards for communication media; and moving picture experts group (MPEG) which is moving picture coding standards for storage media. In each coding scheme, a coding algorithm is employed for realizing a bit rate (transmission rate) that serves a purpose thereof. In JPEG, color data is compressed by a scheme based on Huffman coding and discrete cosine transform (DCT).

On the other hand, in moving picture compression technique such as H.263 and MPEG, generally, orthogonal transform such as DCT is used for the spatial reduction of the amount of information as in JPEG, and motion compensation (MC) is used for the temporal reduction of the amount of information. General MC is performed by executing interframe prediction using a motion vector, i.e., compensating the amount of motion between a current picture and a reference picture.

Further, at the time of the detection of a motion vector, in a search area set in the reference picture, block matching is performed which detects a block that gives a minimum for an evaluation function such as the sum of absolute differences (SAD) from a target block of the current picture. The motion vector refers to a vector indicating the horizontal and vertical relative positions between a target block of the current picture for which motion is to be detected and a block of the reference picture that is most similar to the target block.

On the other hand, in the case where consecutive blocks equally move by translation or the like, the respective motion vectors of the consecutive blocks are equal. However, variations occur in motion vectors for the following reasons (1) to (3) and the like:

(1) In block matching, motion vectors are detected based on only the result of an operation using an evaluation function. Accordingly, in the case where errors such as white noise are included in pictures, variations occur in the detected motion vectors.

(2) Generally, the amount of motion of a substance in a picture is not an integer multiple of a pixel. Accordingly, in the case of processing in units of macroblocks, the amount of motion of each macroblock is approximated to an integer multiple of one pixel, a half pixel, a quarter pixel, or the like. As a result, variations due to approximation occur in the motion vectors.

(3) If block matching is used in the case where a picture has a flat figure, the case where a pattern is repeated, or the like, a similar different portion is apt to be matched. Similarly, in the case where a similar pattern accidentally exists in another portion, there is a possibility that another portion may be matched.

In the case where consecutive motion vectors are equal, the amount of code of the motion vectors can be reduced. However, slight variations occurring in consecutive motion vectors prevent the amount of code of the motion vectors from being reduced. In particular, in the case of a high compression rate, the amount of code of motion vectors becomes dominant in the total amount of code, and compression efficiency is decreased. There also arise problems such as the one that block noise tends to be pronounced when motion vectors differ from adjacent macroblocks. As related art for reducing the amount of code relating to motion vectors, a technique has been proposed in which a plurality of motion vector candidates having matching errors not more than a certain value are detected for one macroblock and in which the motion vector candidate having a smallest difference from a most recently detected motion vector is selected from the plurality of motion vector candidates.

However, in the above-described related art, it is assumed that the most recently detected motion vector is optimum. Accordingly, in the case where the most recently detected motion vector is not optimum, influence is propagated to subsequent motion vectors. As a result, there is a possibility that the total amount of code may increase. In particular, when motion detection is performed on subsampled pictures, the possibility of a false detection of a motion vector becomes high. Accordingly, there is a high possibility that an optimum motion vector cannot be detected by merely selecting the motion vector candidate having a smallest difference from a motion vector of an immediately preceding macroblock. Further, even if a plurality of motion vector candidates are detected in subsampled pictures, there is a possibility that an optimum motion vector may not be included in the plurality of motion vector candidates.

SUMMARY OF THE INVENTION

An aspect of the present invention inheres in a moving picture processor encompassing, a first detector configured to detect a reference block most similar to a target block for which motion is to be detected and which is set in a current picture, and to generate a first motion vector candidate indicating a relative position between the target block and the reference block, the reference block is set in a reference picture different from the current picture in terms of time, a second detector configured to detect a first reference area most similar to a first target area obtained by combining the target block and a first adjacent block adjacent to the target block, and to generate a second motion vector candidate indicating a relative position between the first target area and the first reference area, the first reference area is set in the reference picture, a determination circuit configured to determine a motion vector for the target block, based on the first and second motion vector candidates.

Another aspect of the present invention inheres in a method for processing a moving picture encompassing, detecting a reference block most similar to a target block for which motion is to be detected and which is set in a current picture, the reference block is set in a reference picture different from the current picture in terms of time, generating a first motion vector candidate indicating a relative position between the target block and the reference block, detecting a first reference area most similar to a first target area obtained by combining the target block and a first adjacent block adjacent to the target block, the first reference area is set in the reference picture, generating a second motion vector candidate indicating a relative position between the first target area and the first reference area, and determining a motion vector for the target block, based on the first and second motion vector candidates.

Still another aspect of the present invention inheres in a computer program product for executing an application for a moving picture processor encompassing, instructions configured to detect a reference block most similar to a target block for which motion is to be detected and which is set in a current picture, the reference block is set in a reference picture different from the current picture in terms of time, instructions configured to generate a first motion vector candidate indicating a relative position between the target block and the reference block, instructions configured to detect a first reference area most similar to a first target area obtained by combining the target block and a first adjacent block adjacent to the target block, the first reference area is set in the reference picture, instructions configured to generate a second motion vector candidate indicating a relative position between the first target area and the first reference area, and instructions configured to determine a motion vector for the target block, based on the first and second motion vector candidates.

DETAILED DESCRIPTION OF THE INVENTION

Figure 1:
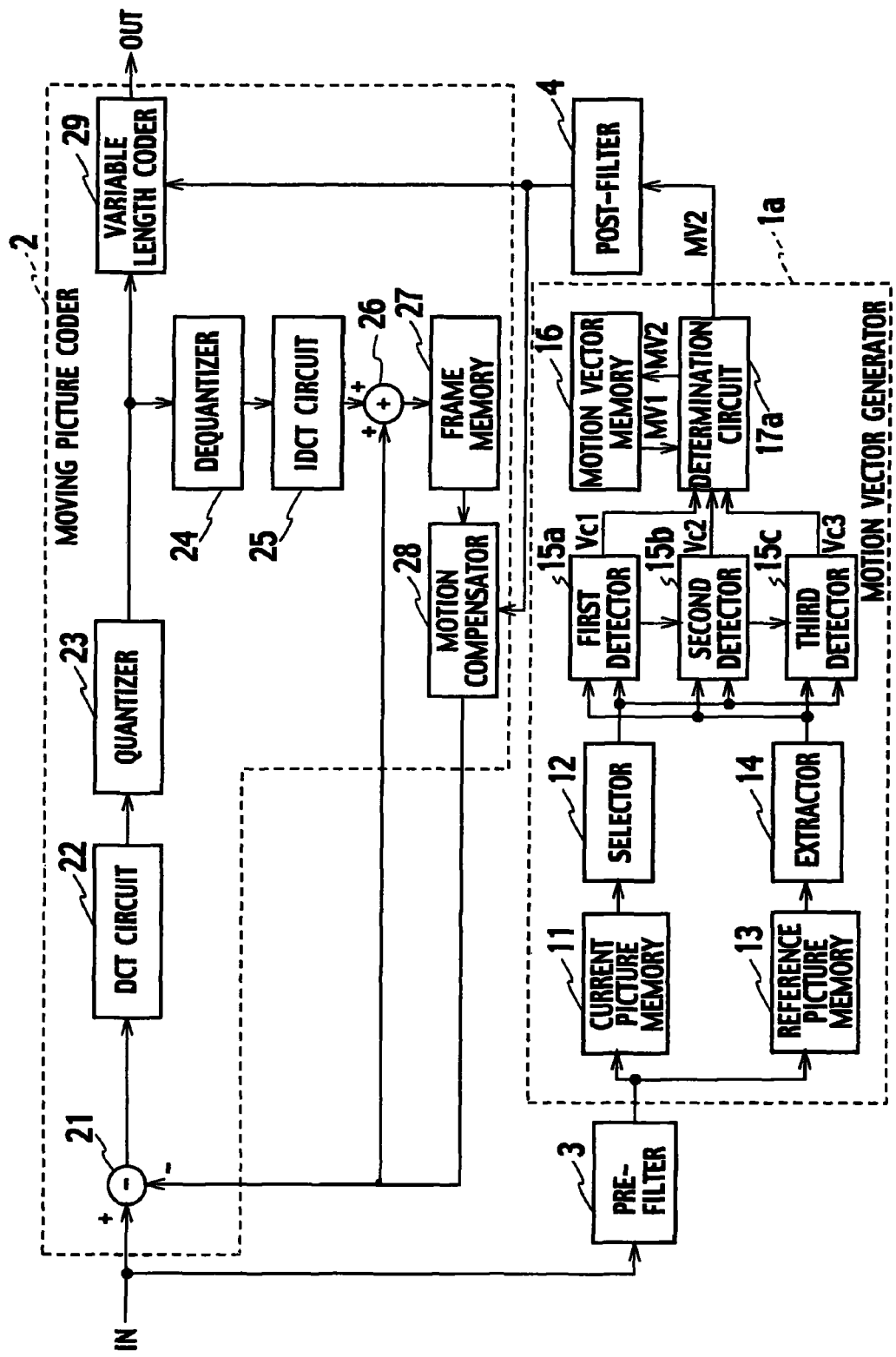
FIG. 1 is a block diagram showing an arrangement of a moving picture processor according to a first embodiment of the present invention.

Various embodiments of the present invention will be described with reference to the accompanying drawings. It is to be noted that the same or similar reference numerals are applied to the same or similar parts and elements throughout the drawings, and description of the same or similar parts and elements will be omitted or simplified. In the following descriptions, numerous specific details are set forth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention with unnecessary detail. In the following description, the words "connect" or "connected" defines a state in which first and second elements are electrically connected to each other without regard to whether or not there is a physical connection between the elements.

FIRST EMBODIMENT

As shown in FIG. 1, a moving picture processor according to a first embodiment of the present invention includes a motion vector generator 1a, a moving picture coder 2, a pre-filter 3, and a post-filter 4. The motion vector generator 1a generates motion vector MV2 for each block in picture data of a current frame (hereinafter referred to as a "current picture"), based on the current picture and picture data of a frame different from that of the current picture in terms of time (hereinafter referred to as a "reference picture").

The motion vector generator 1a includes a current picture memory 11, a reference picture memory 13, a selector 12, an extractor 14, a first detector 15a, a second detector 15b, a third detector 15c, a motion vector memory 16, and a determination circuit 17a. The first detector 15a detects in a reference picture a reference block most similar to a target block B1 for which motion is to be detected and which is set in a current picture shown in FIG. 2, and generates a first motion vector candidate Vc1 indicating the relative position between the target block B1 and the reference block.

Here, an operation using an evaluation function is performed on blocks of the current picture and the reference picture, and the term "most similar" means that an error value calculated by the operation becomes a minimum. It should be noted that the mean square error (MSE) or the mean absolute deviation (MAD) between pixels at the same relative position may be used as the evaluation function used for a matching calculation between a detection target block of the current picture and the reference picture.

Figure 2:
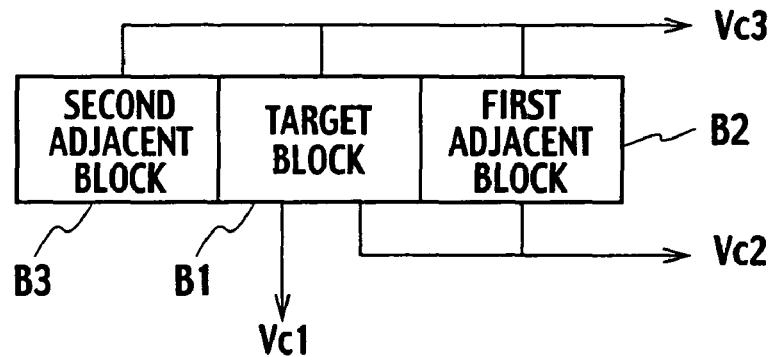
FIG. 2 is a schematic diagram for explaining the function of a motion vector generator according to the first embodiment of the present invention.

The second detector 15b detects in the reference picture a first reference area most similar to a first target area obtained by combining the target block B1 shown in FIG. 2 and a first adjacent block B2 adjacent to the target block B1, and generates a second motion vector candidate Vc2 indicating the relative position between the first target area and the first reference area. A determination circuit 17a determines a motion vector MV2 for the target block B1 using at least the first and second motion vector candidates Vc1 and Vc2.

Figure 3:
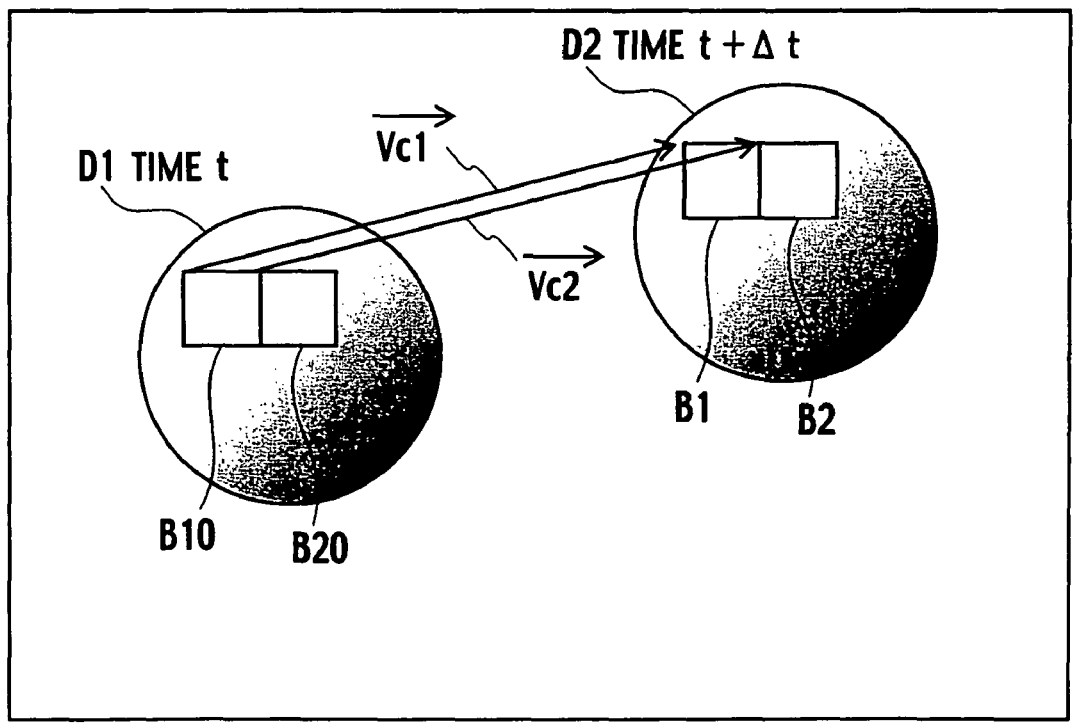
FIG. 3 is a schematic diagram for explaining function of the motion vector generator according to the first embodiment of the present invention.

In the example shown in FIG. 3, it is assumed that a figure D1 exists in the reference picture and that a figure D2 exists in the current picture. A target block B1 in the figure D2 is most similar to a reference block B10 in the figure D1. As a result, a first motion vector candidate Vc1 shown in FIG. 3 is detected by the first detector 15a. However, there is a possibility that an error may occur in the motion vector Vc1 due to the aforementioned reasons.

Accordingly, the second detector 15b detects in the figure D1 a first reference area most similar to a first target area obtained by combining the target block B1 and a first adjacent block B2 in the figure D2, and generates a second motion vector candidate Vc2 shown in FIG. 3. For example, in the case where the first and second motion vector candidates Vc1 and Vc2 are not identical, the determination circuit 17a improves the detection accuracy of a motion vector for the target block B1 by averaging the first and second motion vector candidates Vc1 and Vc2.

A third detector 15c detects a second reference area most similar to a second target area obtained by combining the target block B1 shown in FIG. 2, the first adjacent block B2, and a second adjacent block B3 adjacent to the target block B1, and generates a third motion vector candidate Vc3. A motion vector memory 16 stores the motion vector MV2 determined by the determination circuit 17a. The determination circuit 17a determines the motion vector MV2 for the target block B1 using the first to third motion vector candidates Vc1 to Vc3 and a motion vector (hereinafter referred to as the "preceding motion vector") MV1 stored in the motion vector memory 16.

Accordingly, the detection accuracy of a motion vector can be further improved by the determination circuit 17a selecting the motion vector MV2 from a total of four candidates, i.e., the first to third motion vector candidates Vc1 to Vc3 and the preceding motion vector MV 1.

Specifically, the determination circuit 17a compares the first to third motion vector candidates Vc1 to Vc3 and the preceding motion vector MV1 with each other, and selects identical motion vectors as the motion vector MV2 for the target block B1. For example, in the case where the first and second motion vector candidates Vc1 and Vc2 and the preceding motion vector MV1 are identical, the third motion vector candidate Vc3 is ignored and, for instance, the first motion vector candidate Vc1 is selected as the motion vector MV2.

It should be noted, however, that in the case where none of the first to third motion vector candidates Vc1 to Vc3 and the preceding motion vector MV1 are identical, the determination circuit 17a determines the motion vector MV2 by calculating a weighted mean of the first to third motion vector candidates Vc1 to Vc3 and the preceding motion vector MV1. As one example, the preceding motion vector MV1 is weighted most heavily, and the first motion vector candidate Vc1 is weighted second most heavily. The second motion vector candidate Vc2 is weighted least heavily. The third motion vector candidate Vc3 is weighted more heavily than the second motion vector candidate Vc2 and less heavily than the first motion vector candidate Vc1. In this case, the weights of the preceding motion vector MV1, the first motion vector candidate Vc1, the third motion vector candidate Vc3, and the second motion vector candidate Vc2 can be set to "5," "4," "3," and "2," respectively.

A pre-filter 3 corrects frequency characteristics of picture data IN in order to prevent a detection error of the motion vector MV2. A current picture memory 11 and a reference picture memory 13 retain the current picture and the reference picture, respectively. A selector 12 divides the current picture into a plurality of blocks, and selects the target block B1 shown in FIG. 4, the first adjacent block B2 shown in FIG. 5, and the second adjacent block B3 shown in FIG. 6 from the plurality of blocks. Here, the first and second adjacent blocks B2 and B3 are not limited to being adjacent to the target block B1 in the horizontal direction on a screen (picture) but may be adjacent thereto in the vertical direction.

Figure 4:
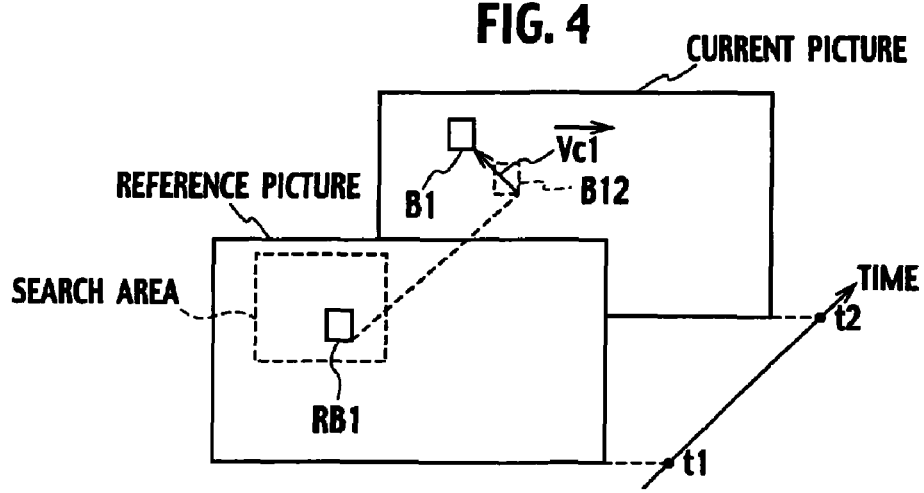
FIG. 4 is a schematic diagram for explaining the function of a first detector according to the first embodiment of the present invention.
Figure 5:
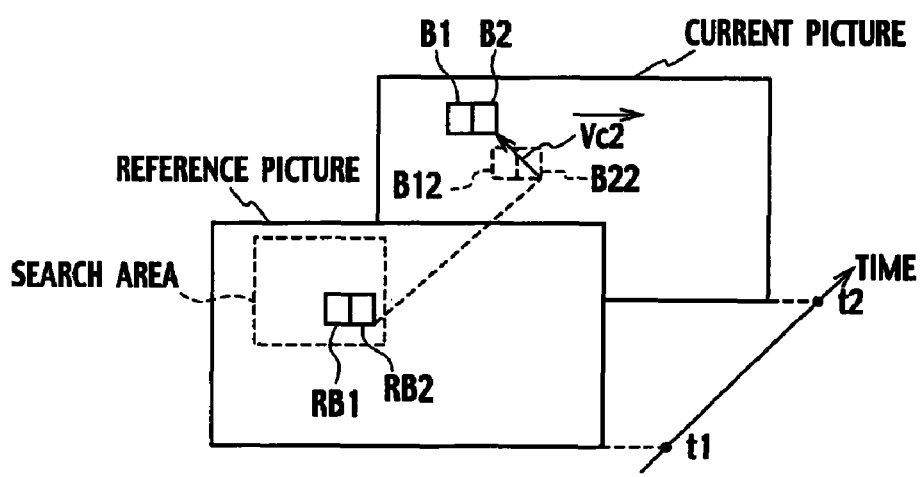
FIG. 5 is a schematic diagram for explaining the function of a second detector according to the first embodiment of the present invention.
Figure 6:
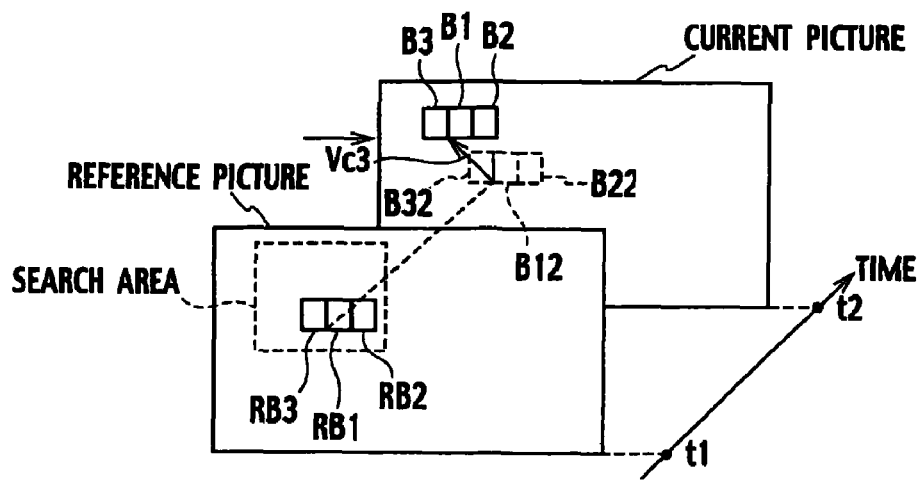
FIG. 6 is a schematic diagram for explaining the function of a third detector according to the first embodiment of the present invention.

As shown in FIGS. 4 to 6, an extractor 14 sets in the reference picture a search area with its center at the position of the target block, and sequentially extracts a reference block RB1, a first adjacent reference block RB2, and a second adjacent reference block RB3 while moving the position of extraction in the search area. An area obtained by combining the reference block RB1 and the first adjacent reference block RB2 shown in FIG. 5 corresponds to the first reference area. An area obtained by combining the reference block RB1, the first adjacent reference block RB2, and the second adjacent reference block RB3 shown in FIG. 6 corresponds to the second reference area.

The first detector 15a detects the reference block RB1 most similar to the target block B1 in the search area of the reference picture, as shown in FIG. 4. As a result, the relative position of the target block B1 with respect to the reference block RB1 is detected as the first motion vector candidate Vc1. It should be noted that block matching is performed in units of macroblocks which are each a 16-by-16 pixel square area in the current picture, sub-macroblocks which are each obtained by dividing a macroblock, or blocks which are each obtained by further dividing a sub-macroblock.

The second detector 15b detects a first reference area most similar to a first target area obtained by combining the target block B1 and the first adjacent block B2 in the search area of the reference picture, as shown in FIG. 5. As a result, the relative position of the first target area with respect to the first target reference area is detected as the second motion vector candidate Vc2.

The third detector 15c detects a second reference area most similar to a second target area obtained by combining the target block B1, the first adjacent block B2, and the second adjacent block B3 in the search area of the reference picture, as shown in FIG. 6. As a result, the relative position of the second target area with respect to the second target reference area is detected as the third motion vector candidate Vc3.

Figure 7:
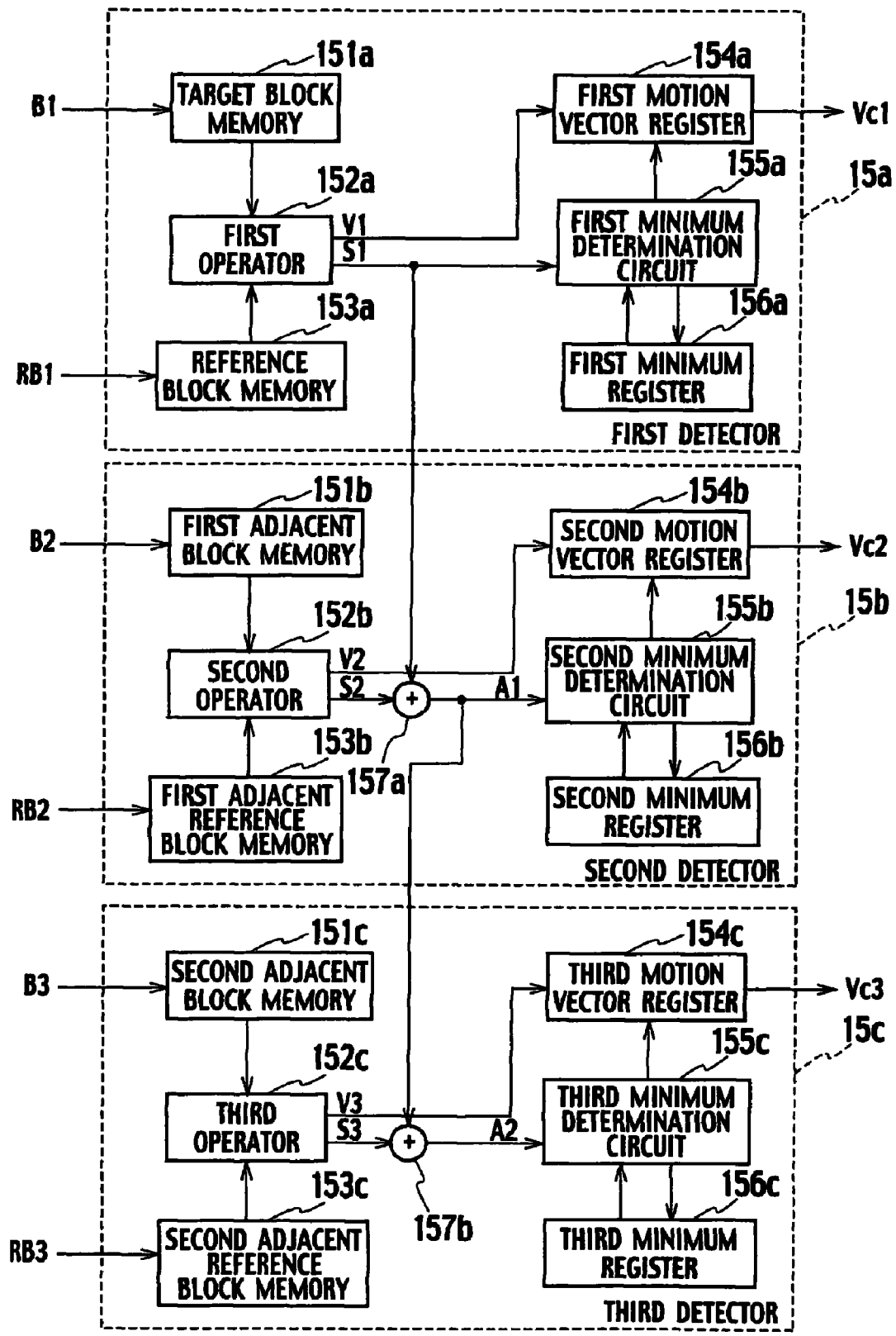
FIG. 7 is a block diagram showing an arrangement example of first to third detectors according to the first embodiment of the present invention.

As shown in FIG. 7, the first detector 15a includes a target block memory 151a, a first operator 152, a reference block memory 153a, a first motion vector register 154a, a first minimum determination circuit 155a, and first minimum register 156a. An input of the target block memory 151a is connected to an output of the selector 12 shown in FIG. 1. An input of the reference block memory 153a is connected to an output of the extractor 14. An input of the first operator 152 is connected to each output of the target block memory 151a and the reference block memory 153a. An input of the first minimum register 156a is connected to an output of the first minimum determination circuit 155a. An input of the first minimum determination circuit 155a is connected to each output of the first operator 152 and the first minimum register 156a. An input of the first motion vector register 154a is connected to each output of the first operator 152 and the first minimum determination circuit 155a.

A target block memory 151a stores data of the target block B1 shown in FIG. 4. A reference block memory 153a stores data of the reference block RB1. For each of reference blocks RB1 sequentially extracted from the search area of the reference picture, a first operator 152a performs a matching operation on the target block B1 and the reference block RB1 using an evaluation function. An error value S1 from the first operator 152a is supplied to a first minimum determination circuit 155a and the second detector 15b.

For each of the reference blocks RB1 sequentially extracted from the search area of the reference picture, the first operator 152a generates a motion vector V1 indicating the relative position between the target block B1 and the reference block RB1. The generated motion vector V1 is stored in a first motion vector register 154a.

The first minimum determination circuit 155a compares the error value S1 with a previous minimum value stored in a first minimum register 156a. When the error value S1 is smaller than the previous minimum value, the first minimum determination circuit 155a stores the error value S1 as an updated minimum value in the first minimum register 156a. As a result, a minimum value of the error value S1 is detected, and the motion vector V1 at the time of the detection of the minimum value is read as the first motion vector candidate Vc1 from the first motion vector register 154a.

The second detector 15b includes a first adjacent block memory 151b, a second operator 152b, a first adjacent reference block memory 153b, a second motion vector register 154b, a second minimum determination circuit 155b, a second minimum register 156b, and a first adder 157a. Here, the second detector 15b differs from the first detector 15a in that the second detector 15b includes the first adder 157a.

The first adjacent block memory 151b stores data of the first adjacent block B2 shown in FIG. 5. The first adjacent reference block memory 153b stores data of the first adjacent reference block RB2. For each of first adjacent reference blocks RB2 sequentially extracted from the search area of the reference picture, the second operator 152b performs a matching operation between the first adjacent block B2 and the first adjacent reference block RB2 using an evaluation function. An error value S2 from the second operator 152b is supplied to the first adder 157a. Further, for each of the first adjacent reference blocks RB2 sequentially extracted from the search area of the reference picture, the second operator 152b generates a motion vector V2 indicating the relative position between the first adjacent block B2 and the first adjacent reference block RB2. The generated motion vector V2 is stored in the second motion vector register 154b. The first adder 157a adds the error value S1 from the first operator 152a and the error value S2 from the second operator 152b and supplies the sum A1 to the second minimum determination circuit 155b.

The second minimum determination circuit 155b compares the sum A1 from the first adder 157a with a previous minimum value stored in the second minimum register 156b. When the sum A1 from the first adder 157a is smaller than the previous minimum value, the second minimum determination circuit 155b stores the sum A1 as an updated minimum value in the second minimum register 156b. As a result, the second minimum determination circuit 155b reads the motion vector V2 which gives a minimum value for the sum A1 of the error value S1 from the first operator 152a and the error value S2 from the second operator 152b, as the second motion vector candidate Vc2 from the second motion vector register 154b.

The third detector 15c includes a second adjacent block memory 151c, a third operator 152c, a second adjacent reference block memory 153c, a third motion vector register 154c, a third minimum determination circuit 155c, a third minimum register 156c, and a second adder 157b. That is, the arrangement of the third detector 15c is similar to the second detector 15b.

The second adjacent block memory 151c stores data of the second adjacent block B3 shown in FIG. 6. The second adjacent reference block memory 153c stores data of the second adjacent reference block RB3. For each second adjacent reference block RB3 extracted from the search area of the reference picture, the third operator 152c performs a matching operation between the second adjacent block B3 and the second adjacent reference block RB3 using the evaluation function. An error value S3 from the third operator 152c is supplied to the second adder 157b. Further, for each of the second adjacent reference blocks RB3 sequentially extracted from the search area of the reference picture, the third operator 152c generates a motion vector V3 indicating the relative position between the second adjacent block B3 and the second adjacent reference block RB3. The generated motion vector V3 is stored in the third motion vector register 154c. The second adder 157b adds the sum A1 to the error value S3 of third operator 152c, and supplies the sum A2 to the third minimum determination circuit 155c.

The third minimum determination circuit 155c compares the sum A2 from the second adder 157b with a minimum value stored in the third minimum register 156c. When the sum A2 from the second adder 157b is smaller than the previous minimum value, the third minimum determination circuit 155c stores the sum A2 as an updated minimum value in the third minimum register 156c. As a result, the third minimum determination circuit 155c reads the motion vector V3 which gives a minimum value for the sum A1 of the error value S1 from the first operator 152a and the error value S3 from the third operator 152c, as the third motion vector candidate Vc3 from the third motion vector register 154c. Thus, the first to third motion vector candidates Vc1 to Vc3 are generated.

On the other hand, as a moving picture coder 2 shown in FIG. 1, for example, a moving picture coder that conforms to the MPEG standards is used. As the picture data IN supplied to the moving picture coder 2, for example, a luminance signal is supplied in units of frames. It should be noted that not only a luminance signal of the picture data IN but also color-difference signals may be used in the detection of the motion vector MV2.

The moving picture coder 2 codes the value of the difference between the current picture and a reference local decode signal (hereinafter referred to as a "predicted picture") which has been motion-compensated using the motion vector MV2.

The moving picture coder 2 includes a subtractor 21, a DCT circuit 22, quantizer 23, a dequantizer 24, an inverse discrete cosine transform (IDCT) circuit 25, a variable length coder 29, an adder 26, a frame memory 27, and a motion compensator 28.

The subtractor 21, the DCT circuit 22, the quantizer 23, and the variable length coder 29 are connected in this order. An input of the dequantizer 24 is connected to an output of the quantizer 23. An input of the IDCT circuit 25 is connected to an output of the dequantizer 24. An input of the adder 26 is connected to an output of the IDCT circuit 25, and another input is connected to an output of the motion compensator 28. An input of the frame memory 27 is connected to an output of the adder 26. An input of the motion compensator 28 is connected to outputs of the frame memory 27 and the post-filter 4.

The DCT circuit 22 performs a perpendicular conversion for a difference value from the subtractor 21. The DCT is one of Fourier transform for transforming two dimensions picture into two dimensions frequency. As a result, the difference value is separated a low frequency component and a high frequency component. The quantizer 23 quantizes the difference value after the perpendicular conversion, and transmits it to the variable length coder 29 and the dequantizer 24. The variable length coder 29 performs a variable length coding for the converted difference value.

A reference local decode signal is generated by the dequantizer 24, the IDCT circuit 25, the adder 26, and the frame memory 27. The motion compensator 28 performs motion compensation on the reference local decode signal using a motion vector. It should be noted that prediction methods include forward prediction which is prediction from a past picture, backward prediction which is prediction from a future picture, and bidirectional prediction which is prediction from past and future pictures.

The variable length coder 29 encodes the motion vector MV2 for one frame outputted by a post-filter 4. Here, the variable length coder 29 encodes the value of the difference between motion vectors obtained from adjacent blocks of the current picture. Since the motion vector generator 1a shown in FIG. 1 can generate motion vectors with high accuracy, variations do not occur in the motion vectors. Accordingly, the value of the difference between motion vectors calculated by the variable length coder 29 is minimized. As a result, the amount of code of a code string generated by the variable length coder 29 is greatly reduced.

Figure 8:
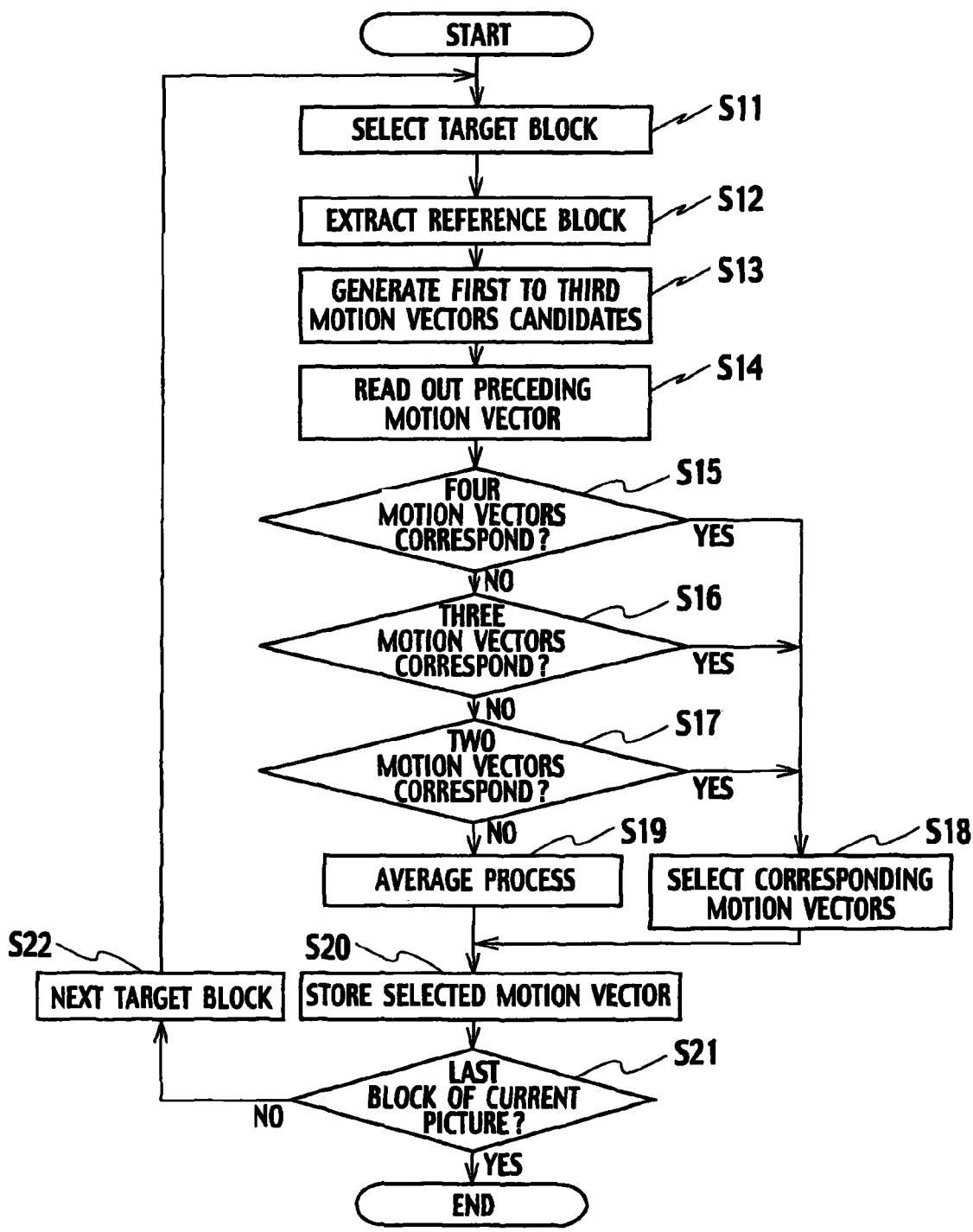
FIG. 8 is a flow chart showing a method for processing a moving picture according to the first embodiment of the present invention.

Next, a method for processing a moving picture according to the first embodiment will be described by referring a flow chart shown in FIG. 8.

In step S11, the selector 12 shown in FIG. 1 divides the current picture stored in the current picture memory 11 into a plurality of blocks, and selects the target block B1, and adjacent blocks B2, B3 adjacent to the target block B1.

In step S12, the extractor 14 sets in the reference picture a search area with its center at the position of the target block, and sequentially extracts a reference block RB1, a first adjacent reference block RB2, and a second adjacent reference block RB3.

In step S13, the first to third detectors 15a to 15c generates the first to third motion vector candidates Vc1 to Vc3, respectively.

In step S14, the determination circuit 17a reads preceding motion vector MV1 stored in the motion vector memory 16. It should be noted that the process of step S14 may be executed in one of steps S11 to step S13.

In step S15, the determination circuit 17a compares the first to third motion vector candidates Vc1 to Vc3 and preceding motion vector MV1, and determines whether the four motion vectors correspond. When it is determined that the four motion vectors correspond, the procedure goes to step S18. In step S18, the corresponding motion vectors are selected as the motion vector MV2 about the target block B13. When it is determined that the four motion vectors do not correspond, the procedure goes to step S16.

In step S16, the determination circuit 17a determines whether three motion vectors in the first to third motion vector candidates Vc1 to Vc3 and the preceding motion vector MV1 correspond. When it is determined that the three vectors correspond, the procedure goes to step S18. When it is determined that the three vectors do not correspond, the procedure goes to step S17.

In step S17, the determination circuit 17a determines whether two motion vectors in the first to third motion vector candidates Vc1 to Vc3 and the preceding motion vector MV1 correspond. When it is determined that the two vectors correspond, the procedure goes to step S18. When it is determined that the two vectors do not correspond, the procedure goes to step S19.

Here, when two sets of the corresponding motion vectors are detected, corresponding motion vectors having large total weight are selected. When the preceding motion vector MV1 and the first motion vector candidate Vc1 correspond, and the second motion vector candidate Vc2 and the third motion vector candidate Vc3 correspond, the set of the preceding motion vector MV1 and the first motion vector candidate Vc1 is selected.

In step S19, the determination circuit 17a determines that the first to third motion vector candidates Vc1 to Vc3 and the preceding motion vector MV1 are not corresponding. Furthermore, the first to third motion vector candidate Vc1 to Vc3 and the preceding motion vector MV1 are averaged by calculating weighted mean by utilizing the weights.

In step S20, the determination circuit 17a subjects the motion vector memory 16 to store the determined motion vector MV2. The stored motion vector is utilized for next comparison target.

In step S21, the selector 12 determines whether the target block B1 is the last block of the current picture. When it determined that the target block B1 is not the last block of the current picture, the procedure goes to step S22, and then the motion vector generating process about next target block B1 is restarted.

As described above, according to the first embodiment, even when the picture data is subsampled or when target block B1 is small, it is possible to generate motion vector MV2 with high precision because it becomes possible to increase estimation target for block matching. It is possible to correct a detection error of a motion vector, and to maintain the sequence of motion vectors, by selecting the motion vector MV2 from the first to third motion vector candidates Vc1 to Vc3 and preceding motion vectors MV1 or by calculating weighted mean. Furthermore, it is possible to prevent influence due to wrong correction from transmitting one after another.

Modification of First Embodiment

Figures 9, 10:
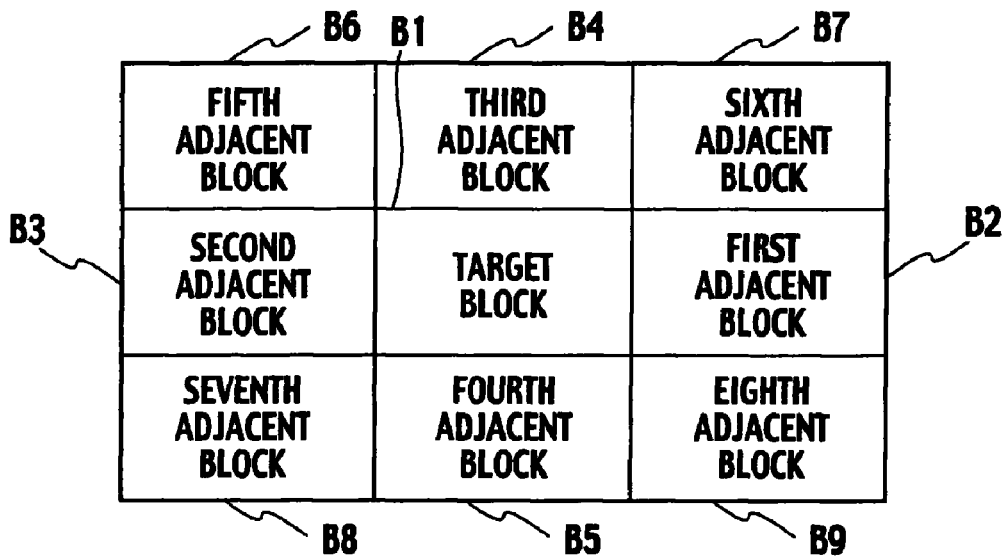
FIG. 9 is a schematic diagram for explaining the function of a motion vector generator according to a modification of the first embodiment of the present invention.
FIG. 10 is a schematic diagram for explaining the function of the motion vector generator according to the modification of the first embodiment of the present invention.

As shown in FIG. 9, six adjacent blocks B4 to B9 adjacent to the target block B1 in the vertical direction and the oblique direction in addition to the horizontal direction. As a result, it is possible to obtain fourth to seventh motion vector candidates Vc4 to Vc7 in addition to the first to third motion vector candidate Vc1 to Vc3, as shown in FIG. 10.

The fourth motion vector candidate Vc4 is generated, based on a third target area obtained by combining the target block B1, the third adjacent block B4, and the fourth adjacent block B5 shown in FIG. 9, and a third reference area in the reference picture most similar to the third target area.

The fifth motion vector candidate Vc5 is generated, based on a fourth target area obtained by combining the target block B1, the fifth adjacent block B6, and the eighth adjacent block B9, and a fourth reference area in the reference picture similar to the fourth target area.

The sixth motion vector candidate Vc6 is generated, based on a fifth target area obtained by combining the target block B1, the sixth adjacent block B7, and the seventh adjacent block B8, and a fifth reference area in the reference picture most similar to the fifth target area.

The seventh motion vector candidate Vc7 is generated, based on a sixth target area obtained by combining the target block B1, the first adjacent block B2, the second adjacent block B3, the third adjacent block B4, the fourth adjacent block B5, the fifth adjacent block B6, the sixth adjacent block B7, the seventh adjacent block B8, and the eighth adjacent block B9, and a sixth reference area in the reference picture most similar to the sixth target area.

The moving picture processor according to the modification of the first embodiment can reduce error detections by maintaining motion vectors.

SECOND EMBODIMENT

Figure 11:
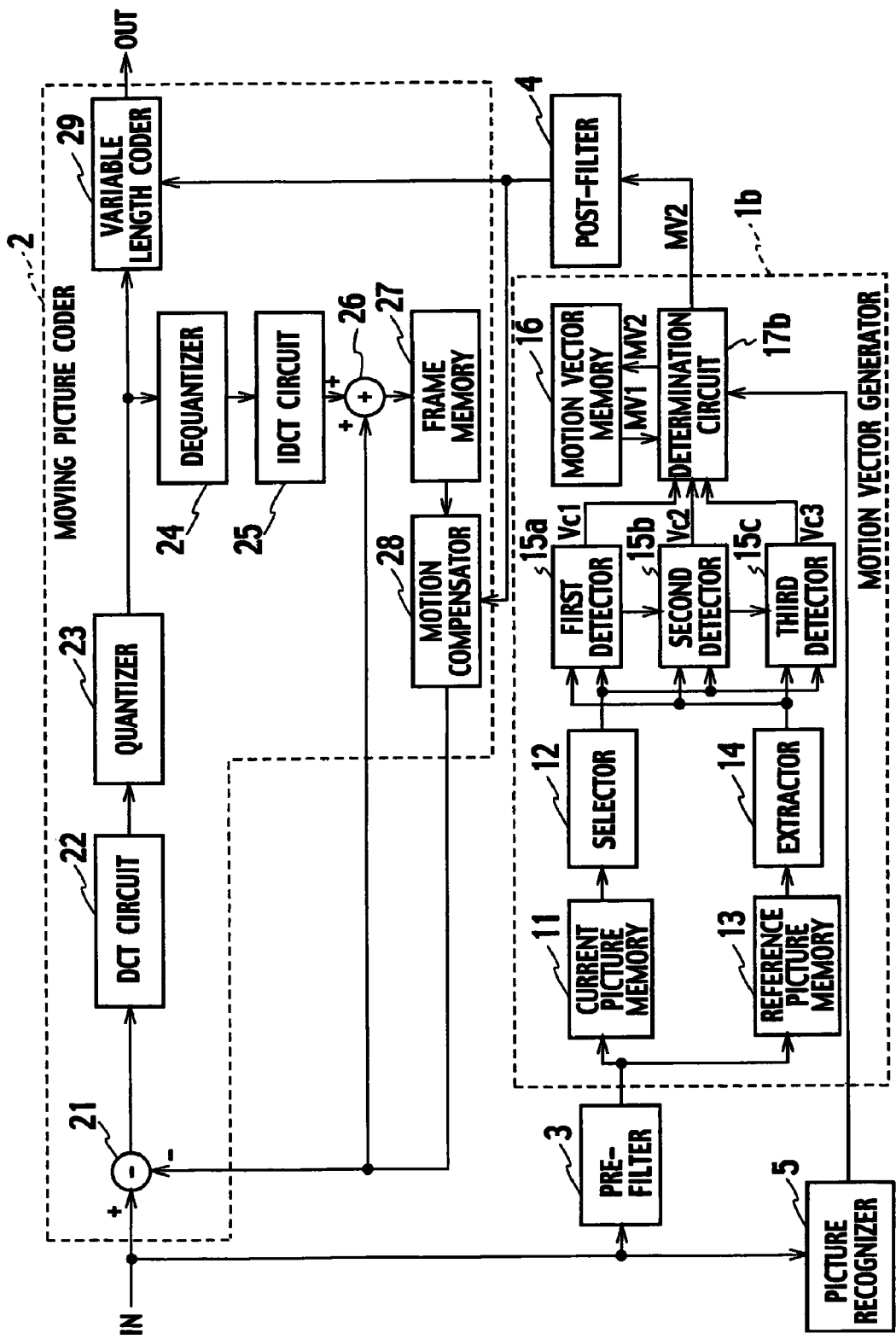
FIG. 11 is a block diagram showing an arrangement of a moving picture processor according to the second embodiment of the present invention.

A moving picture processor according to a second embodiment of the present invention may further include a picture recognizer 5 for recognizing a figure (or a pattern) of the current picture as shown in FIG. 11. The output of the picture recognizer 5 is connected to the input of a determination circuit 17b. Except for this, the configuration is the same as that of FIG. 1. The picture recognizer 5 recognizes a figure of the current picture, and weights the first to third motion vector candidates Vc1 to Vc3 and the preceding motion vector MV1 according to the figure.

For example, for a portion of the current picture which has few figures and low contrast, higher accuracy is obtained in the case where block matching is performed on large areas than in the case where block matching is performed on small areas. On the other hand, for a portion of the current picture which has complex figures, higher accuracy is obtained in the case where block matching is performed on small areas than in the case where block matching is performed on large areas.

Accordingly, for a portion having few figures and low contrast, the second and third motion vector candidates Vc2 and Vc3 are weighted heavily. Further, it becomes possible to reset the weights of the first to third motion vector candidates Vc1 to Vc3 and the preceding motion vector MV1 depending on whether only a predetermined object existing in the current picture is moving or whether the entire current picture is moving.

Figure 12:
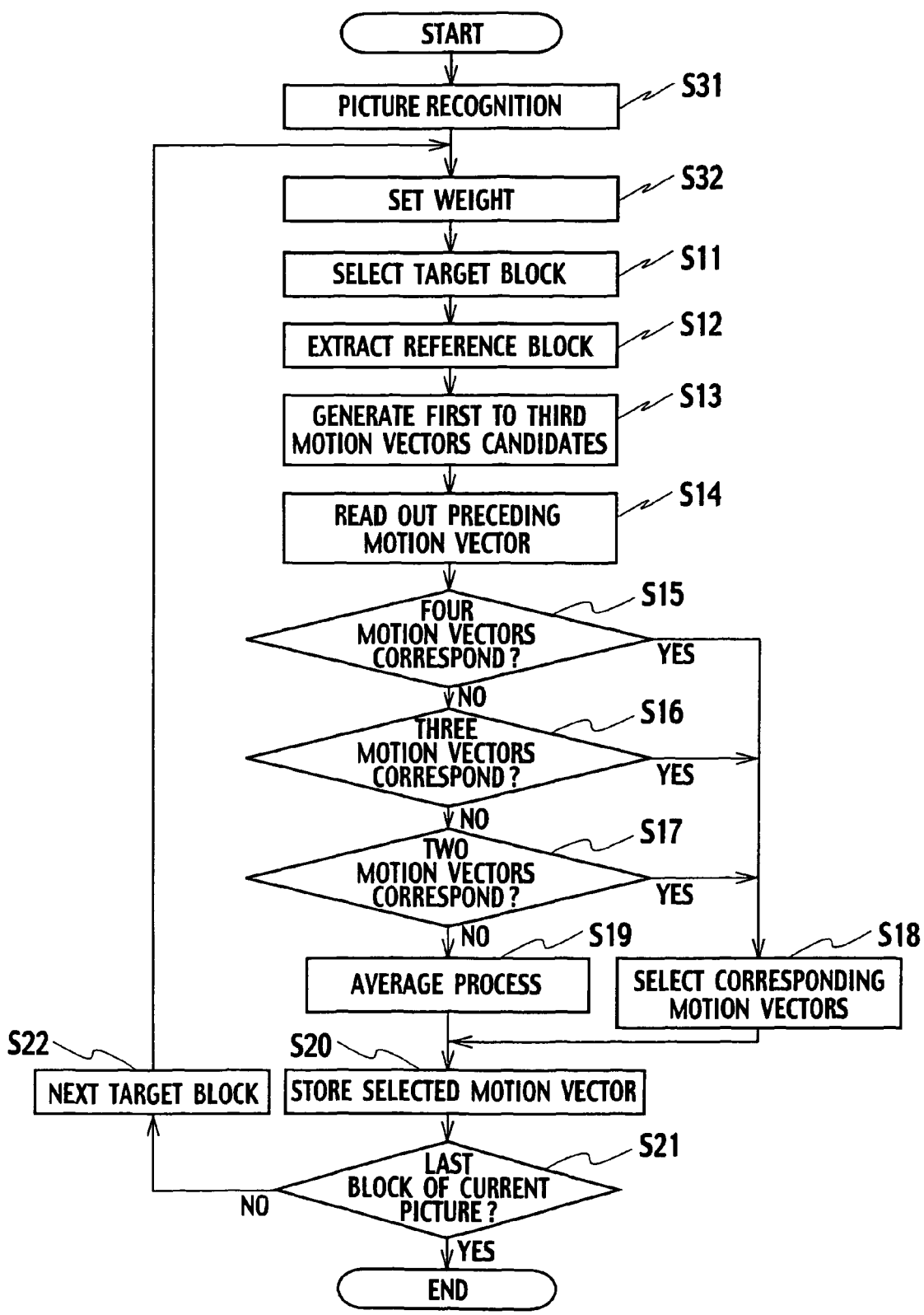
FIG. 12 is a flow chart showing a method for processing a moving picture according to the second embodiment of the present invention.

Next, a method for processing a moving picture according to the second embodiment will be described by referring to a flowchart of FIG. 12. Repeated descriptions for the same processing according to the second embodiment which are the same as the first embodiment are omitted.

In step S31, the picture recognizer 5 recognizes the figure of the current picture. Specifically, the picture recognizer 5 recognizes the complexity of the figure, the motion of entire current picture, and the position of subjects in the current picture.

In step S32, the picture recognizer 5 sets weight to the first to third motion vector candidate Vc1 to Vc3 and the preceding motion vector MV1.

As described above, a moving picture processor according to the second embodiment can set weights of the first to third motion vector candidate Vc1 to Vc3 and the preceding motion vector MV1 for each target block B1, in accordance with the figure of the current picture. Accordingly, it is possible to generate the motion vector MV2 with high precision.

Other Embodiments

Various modifications will become possible for those skilled in the art after receiving the teachings of the present disclosure without departing from the scope thereof.

In the aforementioned first and second embodiments, one example has been described in which in the case where none of a plurality of motion vector candidates and the preceding motion vector MV1 are identical, the final motion vector MV2 is determined by calculating a weighted mean. However, in the case where none of the plurality of motion vector candidates and the preceding motion vector MV1 are identical, the final motion vector MV2 may be determined by selecting a heavily weighted motion vector from the plurality of motion vector candidates and the preceding motion vector MV1.

In the aforementioned first and second embodiment, the pre-filter 3, the motion vector generator 1a, and the post-filter 4 are applied to the moving picture coder 2. However, the motion vector generator 1a may be applied to a format converter or a noise reduction device, instead of the moving picture coder 2.

A local decode picture generated in the moving picture coder 2 may be used for the reference picture without limited to an original picture.

The moving picture processor shown in FIG. 1 and FIG. 11 can be formed as semiconductor integrated circuit (IC) by integrating on a semiconductor chip. In this case, the motion vector memory 16 may be individually arranged.

What is claimed is:

1. A moving picture processor comprising:
   a first detector configured to detect a reference block most similar to a target block for which motion is to be detected and which is set in a current picture, and to generate a first motion vector candidate indicating a relative position between the target block and the reference block, the reference block is set in a reference picture different from the current picture in terms of time;
   a second detector configured to detect a first reference area most similar to a first target area obtained by combining the target block and a first adjacent block adjacent to the target block, and to generate a second motion vector candidate indicating a relative position between the first target area and the first reference area, the first reference area is set in the reference picture; and
   a determination circuit configured to determine a motion vector for the target block, based on the first and second motion vector candidates.

2. The moving picture processor of claim 1, further comprising:
   a third detector configured to detect a second reference area most similar to a second target area obtained by combining the target block, the first adjacent block, and a second adjacent block adjacent to the target block, and to generate a third motion vector candidate indicating a relative position between the second target area and the second reference area, the second reference area is set in the reference picture; and
   a motion vector memory configured to store the motion vector determined by the determination circuit,
   wherein the determination circuit compares the first to third motion vector candidates and the stored motion vector with each other, and determines the motion vector for the target block, in accordance with a comparison result.

3. The moving picture processor of claim 2, wherein the determination circuit compares the first to third motion vector candidates and the stored motion vector with each other, and selects identical motion vectors as a motion vector for the target block.

4. The moving picture processor of claim 2, wherein the stored motion vector, the first motion vector candidate, the second motion vector candidate, and the third motion vector candidate are weighted heavily in this order.

5. The moving picture processor of claim 4, wherein the determination circuit calculates a weighted mean of the first to third motion vector candidates and the stored motion vector when none of the first to third motion vector candidates and the stored motion vector is identical.

6. The moving picture processor of claim 4, wherein the determination circuit selects a motion vector weighted most heavily when none of the first to third motion vector candidates and the stored motion vector is identical.

7. The moving picture processor of claim 2, wherein the first detector comprises:

a target block memory configured to store data of the target block;

a reference block memory configured to store data of the reference block;

a first operator configured to execute an matching operation between the target block and the reference block, and to generate a first motion vector and a first error value of the matching operation;

a first motion vector register configured to store the first motion vector;

a first minimum register configured to store the first error value; and a first minimum determination circuit configured to read the first motion vector out of the first motion vector register as the first motion vector candidate when the first error value becomes minimum.

8. The moving picture processor of claim 7, wherein the second detector comprises:

a first adjacent block memory configured to store data of the first adjacent block;

a first adjacent reference block memory configured to store data of the first adjacent reference block;

a second operator configured to execute a matching operation between the first adjacent block and the first adjacent reference block, and to generate a second motion vector and a second error value of the matching operation;

a second motion vector register configured to store the second motion vector;

a first adder configured to add the first error value to the second error value, and to obtain a first sum;

a second minimum register configured to store the first sum; and a second minimum determination circuit configured to read the second motion vector out of the second motion vector register as the second motion vector candidate when the first sum becomes minimum.

9. The moving picture processor of claim 8, wherein the third detector comprises:

a second adjacent block memory configured to store data of the second adjacent block;

a second adjacent reference block memory configured to store data of the second adjacent reference block;

a third operator configured to execute a matching operation between the second adjacent block and the second adjacent reference block, and to generate third motion vector and third error value of the matching operation;

a third motion vector register configured to store the third motion vector;

a second adder configured to add the third error value to the first sum, and to obtain second sum;

a third minimum register configured to store the second sum; and a third minimum determination circuit configured to read the third motion vector out of the third motion vector register as the third motion vector candidate when the second sum becomes minimum.

10. The moving picture processor of claim 2, wherein the first and second adjacent block are adjacent in horizontal direction of the target block.

11. The moving picture processor of claim 10, wherein the determination circuit determines the motion vector of the target block by further utilizing a fourth motion vector candidate indicating a relative position between a third target area and a third reference area most similar to the third target area, the third target area is obtained by combining the target block, the first adjacent block, the second adjacent block, and a third adjacent block vertically adjacent to the target block.

12. The moving picture processor of claim 2, further comprising a picture recognizer configured to recognize a figure of the current picture, and to weight the first to third motion vector candidates and the stored motion vector, in accordance with the figure.

13. A method for processing a moving picture comprising:

detecting, by a first detector, a reference block most similar to a target block for which motion is to be detected and which is set in a current picture, the reference block is set in a reference picture different from the current picture in terms of time;

generating, by the first detector, a first motion vector candidate indicating a relative position between the target block and the reference block;

detecting, by a second detector, a first reference area most similar to a first target area obtained by combining the target block and a first adjacent block adjacent to the target block, the first reference area is set in the reference picture;

generating, by the second detector, a second motion vector candidate indicating a relative position between the first target area and the first reference area; and determining, by a determination circuit, a motion vector for the target block, based on the first and second motion vector candidates.

14. The method of claim 13, further comprising:

detecting, by a third detector, a second reference area most similar to a second target area obtained by combining the target block, the first adjacent block, and a second adjacent block adjacent to the target block, the second reference area is set in the reference picture;

generating, by the third detector, a third motion vector candidate indicating a relative position between the second target area and the second reference area; and storing, in a memory, the determined motion vector, wherein the determination of the motion vector includes comparing the first to third motion vector candidates and the stored motion vector with each other, and determining the motion vector for the target block, in accordance with a comparison result.

15. The method of claim 14, wherein the determining the motion vector comprises:

comparing the first to third motion vector candidates and the stored motion vector with each other; and selecting identical motion vectors as a motion vector for the target block.

16. The method of claim 14, wherein the determining the motion vector comprises calculating a weighted mean of the first to third motion vector candidates and the stored motion vector when none of the first to third motion vector candidates and the stored motion vector is identical.

17. A non-transitory computer readable medium for executing a computer implemented application for a moving picture processor, the computer implemented application comprising:

computer executable instructions configured to detect a reference block most similar to a target block for which motion is to be detected and which is set in a current picture, the reference block is set in a reference picture different from the current picture in terms of time;

computer executable instructions configured to generate a first motion vector candidate indicating a relative position between the target block and the reference block;

computer executable instructions configured to detect a first reference area most similar to a first target area obtained by combining the target block and a first adjacent block adjacent to the target block, the first reference area is set in the reference picture;

computer executable instructions configured to generate a second motion vector candidate indicating a relative position between the first target area and the first reference area; and computer executable instructions configured to determine a motion vector for the target block, based on the first and second motion vector candidates.

18. The non-transitory computer readable medium of claim 17, further comprising:

computer executable instructions configured to detect a second reference area most similar to a second target area obtained by combining the target block, the first adjacent block, and a second adjacent block adjacent to the target block, the second reference area is set in the reference picture;

computer executable instructions configured to generate a third motion vector candidate indicating a relative position between the second target area and the second reference area; and computer executable instructions configured to store the determined motion vector, wherein the computer executable instructions configured to determine the motion vector comprise:

computer executable instructions configured to comparing the first to third motion vector candidates and the stored motion vector with each other; and computer executable instructions configured to determine the motion vector for the target block, in accordance with a comparison result.

19. The non-transitory computer readable medium of claim 18, wherein the computer executable instructions configured to determine the motion vector comprise:

computer executable instructions configured to compare the first to third motion vector candidates and the stored motion vector with each other; and computer executable instructions configured to select identical motion vectors as a motion vector for the target block.

20. The non-transitory computer readable medium of claim 18, wherein the computer executable instructions configured to determine the motion vector comprise computer executable instructions configured to calculate a weighted mean of the first to third motion vector candidates and the stored motion vector when none of the first to third motion vector candidates and the stored motion vector is identical.

* * * * *